United States Patent
Spaggiari

(10) Patent No.: US 9,511,790 B2
(45) Date of Patent: Dec. 6, 2016

(54) MOTOR VEHICLE STEERING WHEEL PROVIDED WITH REDUNDANT CONTROLS

(71) Applicant: Ferrari S.p.A., Modena (IT)

(72) Inventor: Patrizio Spaggiari, Modena (IT)

(73) Assignee: Ferrari S.p.A., Modena (IT)

( * ) Notice: Subject to any disclaimer, the term of this patent is extended or adjusted under 35 U.S.C. 154(b) by 41 days.

(21) Appl. No.: 14/497,511

(22) Filed: Sep. 26, 2014

(65) Prior Publication Data

US 2015/0082932 A1 Mar. 26, 2015

(30) Foreign Application Priority Data

Sep. 26, 2013 (IT) .................................. BO13A0528

(51) Int. Cl.
*B62D 1/04* (2006.01)
*G05G 1/10* (2006.01)
*B60Q 1/00* (2006.01)
*B60Q 1/34* (2006.01)

(52) U.S. Cl.
CPC .............. *B62D 1/046* (2013.01); *B60Q 1/0082* (2013.01); *B60Q 1/343* (2013.01); *G05G 1/10* (2013.01); *Y10T 74/20256* (2015.01)

(58) Field of Classification Search
CPC ....... B62D 1/046; B60Q 1/0082; B60Q 1/326; B60Q 1/1484; G05G 1/10; Y10T 74/20256; Y10T 74/20834
See application file for complete search history.

(56) References Cited

U.S. PATENT DOCUMENTS 6,626,062 B1 * 9/2003 Yoshitake .............. B60K 37/06
74/552
2011/0198201 A1 8/2011 Chuang

FOREIGN PATENT DOCUMENTS

| DE | 100 41 590 A1 | 4/2001 | |
|---|---|---|---|
| DE | 10 2008 059 417 A1 | 6/2010 | |
| EP | 1 304 507 A1 | 4/2003 | |
| WO | WO 2007066507 A1 * | 6/2007 | ........... B60Q 1/1484 |

* cited by examiner

*Primary Examiner* — Thomas Diaz
(74) *Attorney, Agent, or Firm* — Blank Rome LLP

(57) ABSTRACT

A motor vehicle steering wheel provided with controls for the turn indicators; the steering wheel has: a central hub, which is mounted so as to rotate; an outer crown, which extends around the central hub, is suited to be held by the driver, and is rigidly coupled to the central hub by means of at least two spokes; two upper controls, each of which is mounted on an upper surface of a corresponding spoke and operates the right turn indicators or the left turn indicators; and two lower controls, each of which is mounted on a lower surface of a corresponding spoke on the opposite side of the relative upper control, and operates the turn indicators that are opposite to the turn indicators operated by the relative upper control.

10 Claims, 11 Drawing Sheets

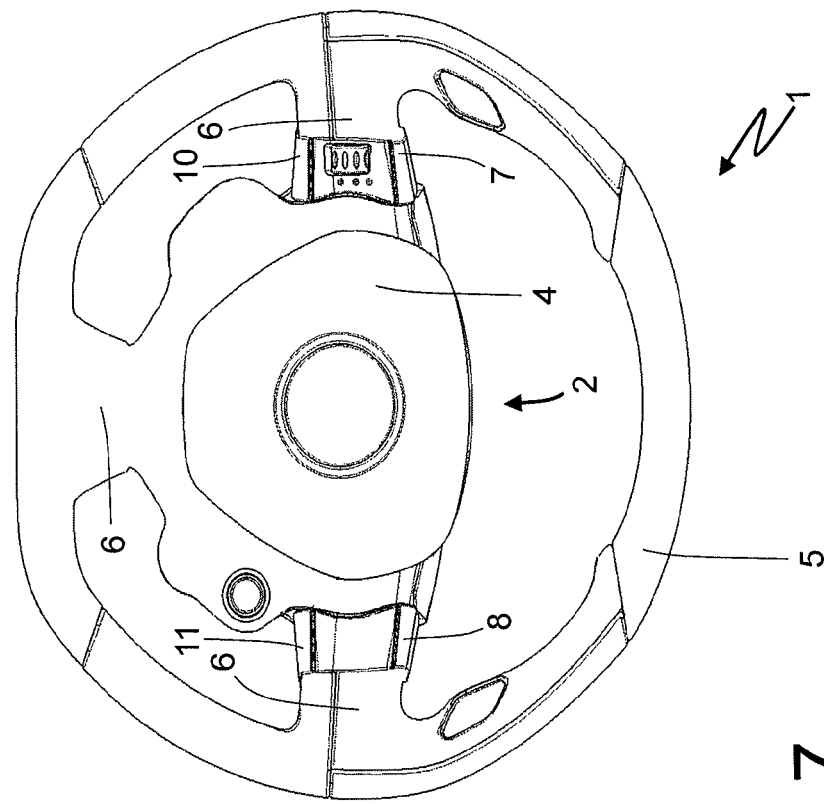
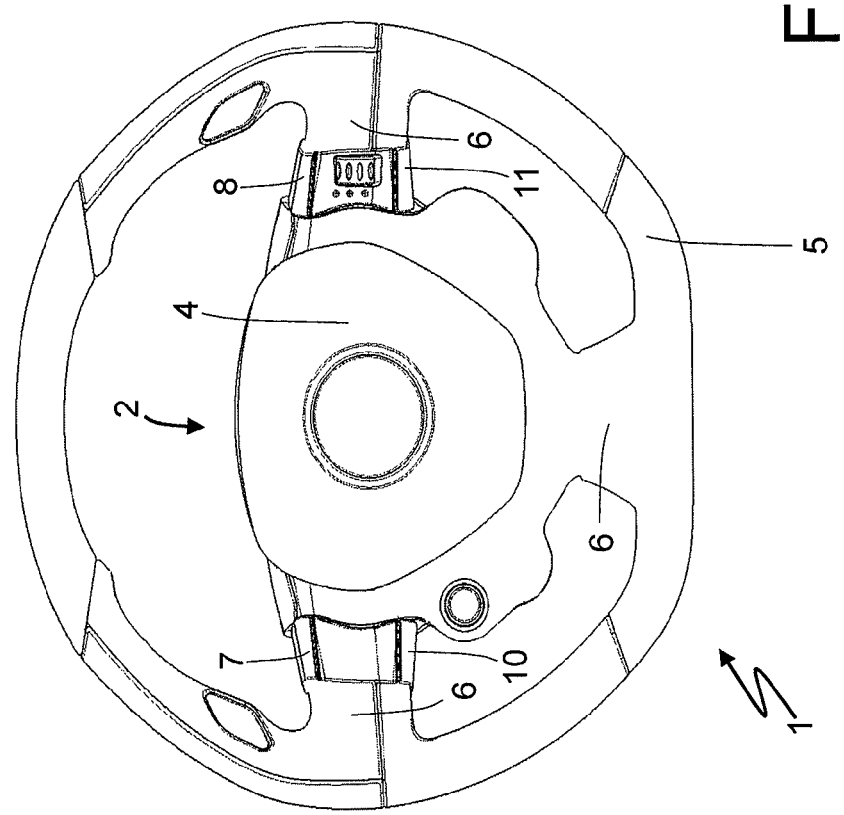
Fig. 7

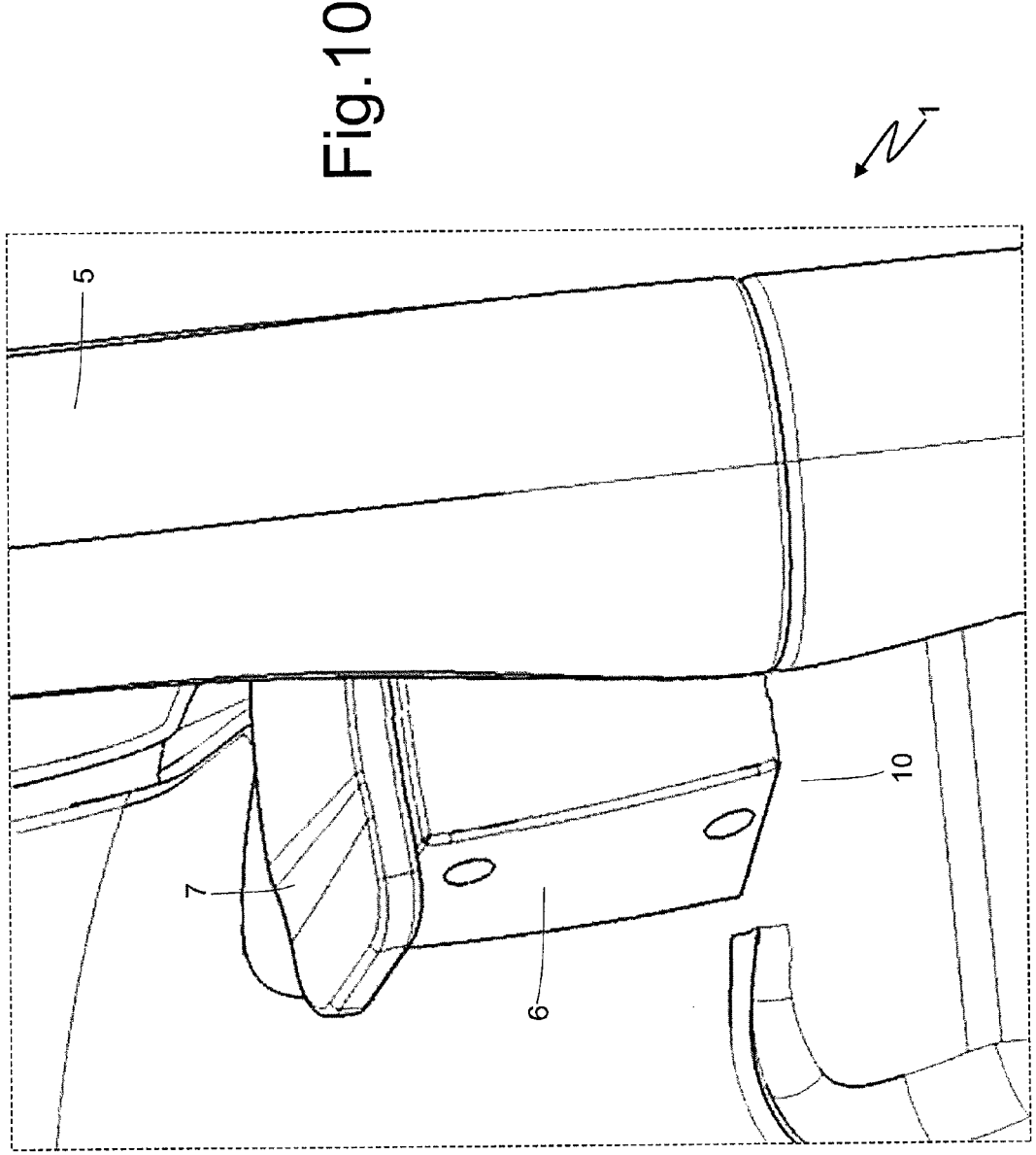

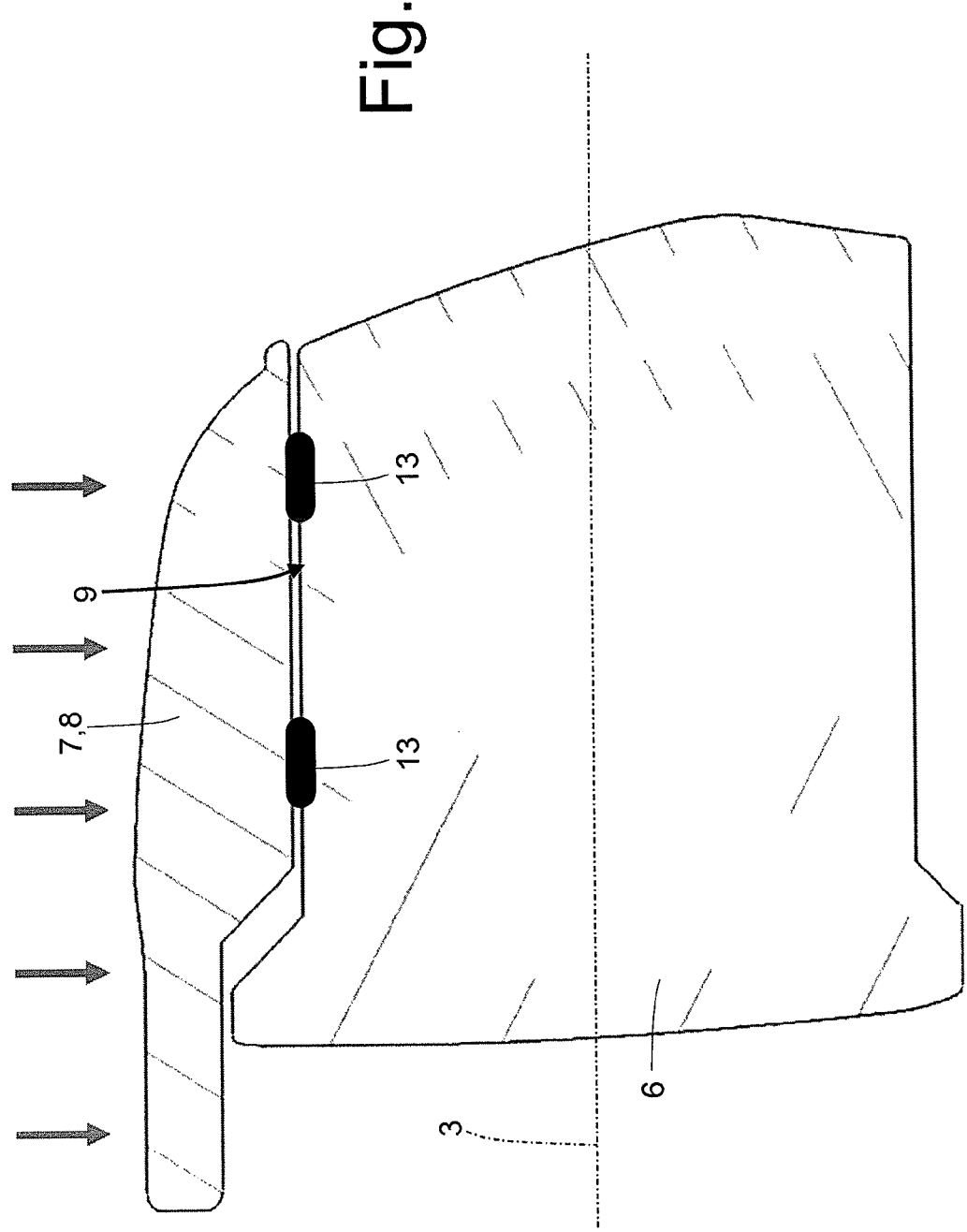

MOTOR VEHICLE STEERING WHEEL PROVIDED WITH REDUNDANT CONTROLS

BACKGROUND OF THE INVENTION

1. Field of the Invention

The present invention relates to a motor vehicle steering wheel provided with controls to operate corresponding devices of the motor vehicle.

The present invention is advantageously applied to a steering wheel provided with controls to operate the turn indicators, to which the following description will explicitly refer without losing in generality.

2. Description of the Related Art

In order to circulate on public roads, a motor vehicle is to be provided with light turn indicators (the so-called "turn signals"), which signal the intention to modify the direction of the motor vehicle.

The light turn indicators are traditionally operated (that is, switched on or off) by means of a control, which is mounted on the steering column (normally on the left side of the steering column) and is vertically movable (that is, the control is pushed upwards to operate the right turn indicators and is pushed downwards to operate the left turn indicators).

It has been recently suggested to arrange the control of the turn indicators on the steering wheel so that the driver can operate the turn indicators without ever removing his/her hands from the steering wheel (in particular when the steering wheel is already partially turned to the left or to the right). In particular, the steering wheel comprises a central hub which is mounted so as to rotate on the steering column, an outer crown which is suited to be held by the driver and at least two spokes which connect the outer crown to the central hub and are arranged symmetrically to the right and to the left of the central hub; the control of the turn indicators comprises two controls, which are arranged on opposite sides of the central hub on the corresponding spokes, and the control arranged to the left (when the steering wheel is in the neutral position corresponding to a straight trajectory) obviously operates the left turn indicators and the control arranged to the right (when the steering wheel is in the neutral position corresponding to a straight trajectory) obviously operates the right turn indicators.

However, certain drivers have found the above-described conformation of the turn indicator controls on the steering wheel not to be completely ergonomic, because, when the steering wheel is rotated, confusion may arise as to which control operates the left turn indicators and which one operates the right turn indicators. In other words, when the steering wheel is in the neutral position (corresponding to a straight trajectory), the control which operates the left turn indicators is to the left of the hub and the control which operates the right turn indicators is to the right of the central hub; instead, when the steering wheel is rotated by 90°, the controls which operate the turn indicators are up and down relative to the central hub and when the steering wheel is rotated by 180°, the control which operates the left turn indicators is to the right of the hub and the control which operates the right turn indicators is to the left of the central hub. Accordingly, when the steering wheel is rotated, it is possible for the driver not to immediately and intuitively perceive which control operates the left turn indicators and which control operates the right turn indicators.

Patent Application US2011198201A1 describes a motor vehicle steering wheel provided with pushbutton controls to operate the turn indicators of the motor vehicle; the embodiment shown in FIG. 7 provides a pair of upper controls which operate the turn indicators and are mounted each on an upper surface of a corresponding spoke of the steering wheel, and a pair of lower controls, each of which is mounted on a lower surface of a corresponding spoke on the opposite side of the relative upper control, and operates a different turn indicator from the turn indicator operated by the relative upper control.

SUMMARY OF THE INVENTION

It is the object of the present invention to provide a motor vehicle steering wheel provided with controls, which steering wheel is free from the above-described drawbacks while being easy and cost-effective to be made.

According to the present invention, a motor vehicle steering wheel provided with controls is provided as claimed in the appended claims.

BRIEF DESCRIPTION OF THE DRAWINGS

The present invention will now be described with reference to the accompanying drawings, which show some non-limiting embodiments thereof, in which:

FIG. 7 shows the steering wheel in FIG. 1, with two opposite orientations;

FIG. 10 is a perspective view of a control to operate the turn indicators of the steering wheel in FIG. 9; and FIG. 11 is a diagrammatic sectional view of the control to operate the turn indicators in FIG. 10.

PREFERRED EMBODIMENTS OF THE INVENTION

Figure 1:
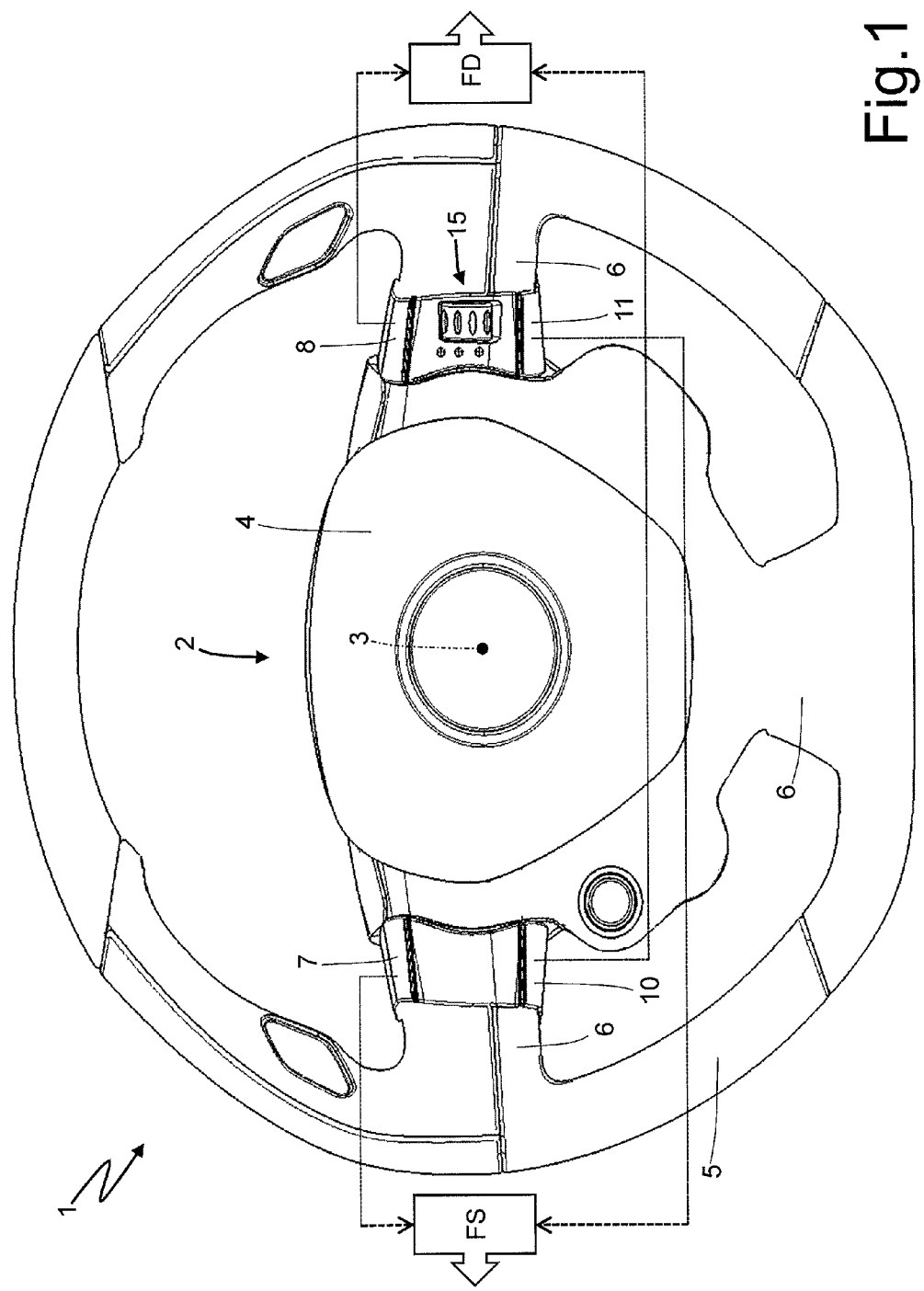
FIG. 1 is a perspective view of a motor vehicle steering wheel which is provided with controls to operate the turn indicators and is made in accordance with the present invention.
Figure 2:
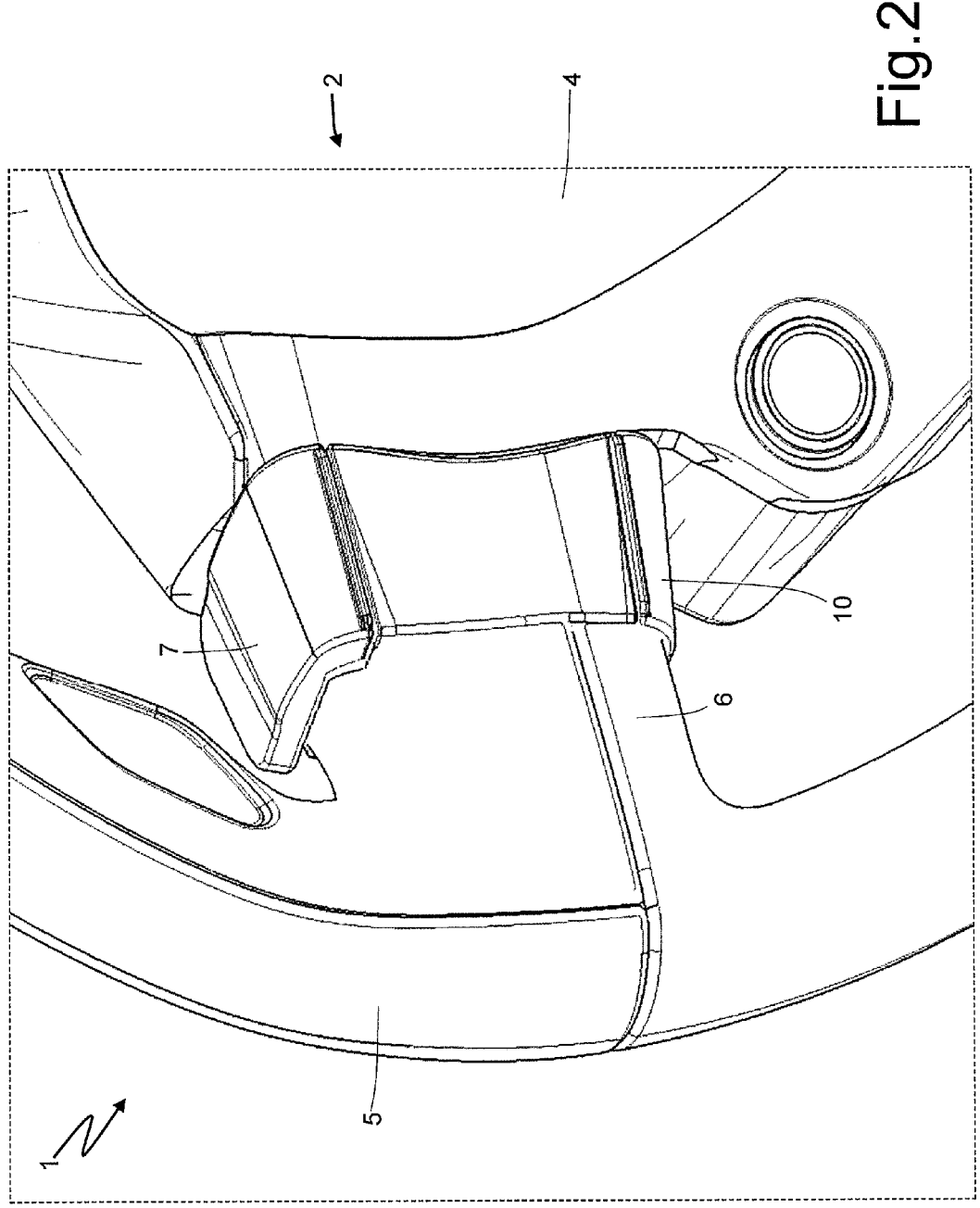
FIGS. 2 and 3 are two different perspective views of a same control to operate the turn indicators of the steering wheel in FIG. 1.

FIG. 1, reference numeral 1 indicates a steering wheel as a whole, suited to operate the steering of the front wheels (not shown) of a motor vehicle (not shown).

The steering wheel 1 comprises a central hub 2, which is mounted so as to rotate at a free end of a steering column (not shown) to rotate around a rotation axis 3. The central hub 2 has a cavity (not shown), which opens outwardly at a front face of the central hub 2 and is closed by a front cover 4 to define a chamber for accommodating an airbag (not shown).

The steering wheel 1 further comprises an outer crown 5, which extends around the central hub 2, is suited to be held by the driver, and is rigidly coupled to the central hub 2 by means of two lateral spokes 6 (that is, they are laterally arranged on opposite sides of the central hub 2 when the steering wheel 1 is in the neutral position corresponding to a straight trajectory) and a lower spoke 6 (that is, arranged at the bottom when the steering wheel 1 is in the neutral position corresponding to a straight trajectory).

The steering wheel 1 comprises two upper controls 7 and 8, each of which is mounted on an upper surface 9 (better shown in FIGS. 4-6) of a corresponding spoke 6 and operates the left turn indicators FS and the right turn indicators FD, respectively; in other words, the upper control 7 is arranged to the left when the steering wheel 1 is in the neutral position (shown in FIG. 1) and operates the left turn indicators FS, while the upper control 8 is arranged to the right when the steering wheel 1 is in the neutral position (shown in FIG. 1) and operates the right turn indicators FD.

Furthermore, the steering wheel 1 comprises two lower controls 10 and 11, each of which is mounted on a lower surface 12 (better shown in FIGS. 4-6) of a corresponding spoke 6 and operates the right turn indicators FD and the left turn indicators FS, respectively; in other words, the lower control 10 is arranged to the left when the steering wheel 1 is in the neutral position (shown in FIG. 1) and operates the right turn indicators FD, while the lower control 11 is arranged to the right when the steering wheel 1 is in the neutral position (shown in FIG. 1) and operates the left turn indicators FS.

The upper surface 9 and the lower surface 12 of each spoke 6 are arranged parallel to the rotation axis 3, that is they have an axial orientation; a front surface and a rear surface of each spoke 6 are instead arranged perpendicular to the rotation axis 3, that is they have a radial orientation.

In essence, the left spoke 6 (that is spoke 6 which is arranged to the left of the central hub 2 when the steering wheel 1 is in the neutral position) supports at the top (that is, on the upper surface 9) the upper control 7 which operates the left turn indicators FS, and supports at the bottom (that is, on the lower surface 12 thereof) the lower control 10 which operates the right turn indicators FD. Similarly, the right spoke 6 (that is spoke 6 which is arranged to the right of the central hub 2 when the steering wheel 1 is in the neutral position) supports at the top (that is, on the upper surface 9 thereof) the upper control 8 which operates the right turn indicators FD, and supports at the bottom (that is, on the lower surface 12 thereof) the lower control 11 which operates the left turn indicators FS.

By rotating the steering wheel 1 by 180° (as shown in FIG. 7), each upper control 7 and 8 changes place with the opposite lower control 11 and 10; that is, by rotating the steering wheel 1 by 180° (as shown in FIG. 7), the upper control 7 is in the place of the lower control 11 (and vice versa) and the upper control is in the place of the lower control 10 (and vice versa). Thereby, by rotating the steering wheel 1 by 180° (as shown in FIG. 7), the upper controls 7 and 8 and the lower controls 10 and 11 change place without modifying the situation for the driver in any manner: indeed, when the steering wheel 1 is in the neutral position (as shown to the left in FIG. 7), there is a top left control (the upper control 7) which operates the left turn indicators FS and there is a top right control (the upper control 8) which operates the right turn indicators FD, and similarly when the steering wheel 1 is rotated by 180° (as shown to the right in FIG. 7), there is a top left control (the lower control 11) which operates the left turn indicators FS and there is a top right control (the lower control 10) which operates the right turn indicators FD.

According to a possible (but not binding) embodiment, each upper control 7 and 8 is symmetrically specular to the opposite lower control 11 and 12 so that by rotating the steering wheel by 180°, the situation of the driver's controls does not change in terms of function, form or position.

According to an alternative embodiment, neither upper control 7 nor 8 is symmetrically specular to the lower control 11 and 12.

Figure 3:
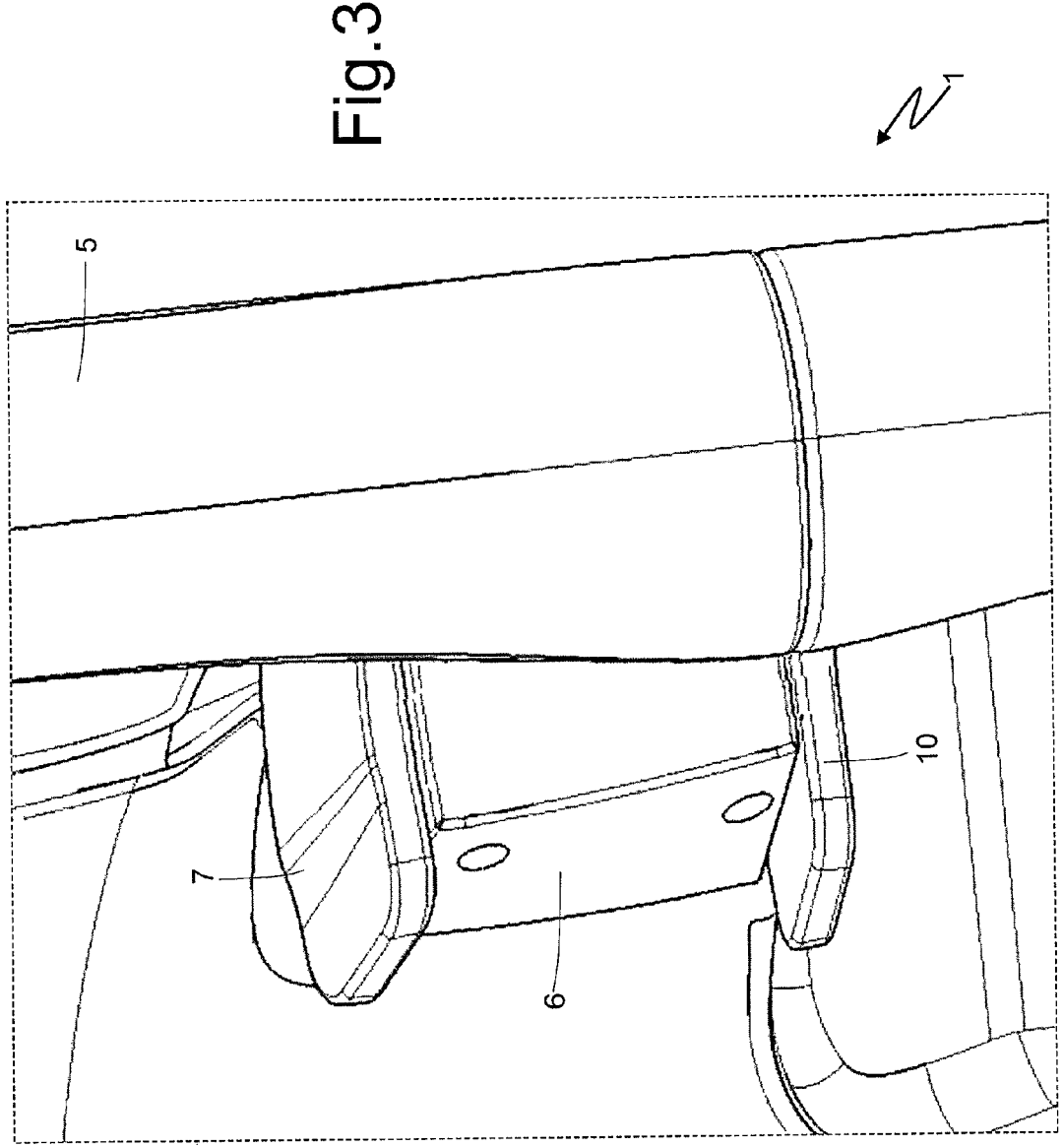

As shown in FIG. 3, each control 7, 8, 10 and 11 has a rear appendage (projection), which protrudes from the rear side from the corresponding spoke 6 to axially come out of (that is, parallel to the rotation axis 3 of the steering wheel 1) the rear wall of the spoke 6 itself; in other words, each rear appendage comes out outside the rear wall of the corresponding spoke 6 so that the fingers of the hand located behind spoke 6 can push on the corresponding control 7, 8, 10 and 11. Due to the rear appendage, each control 7, 8, 10 and 11 can be actuated (operated) from the front by the thumb or from behind with the other fingers on the hand. According to a different, perfectly equivalent embodiment, only the upper controls 7 and 8 have the rear appendages (and therefore the lower controls 10 and 11 do not have the rear appendages); alternatively, only the lower controls 10 and 11 have the rear appendages (and therefore the upper controls 7 and 8 do not have the rear appendages).

Figure 4:
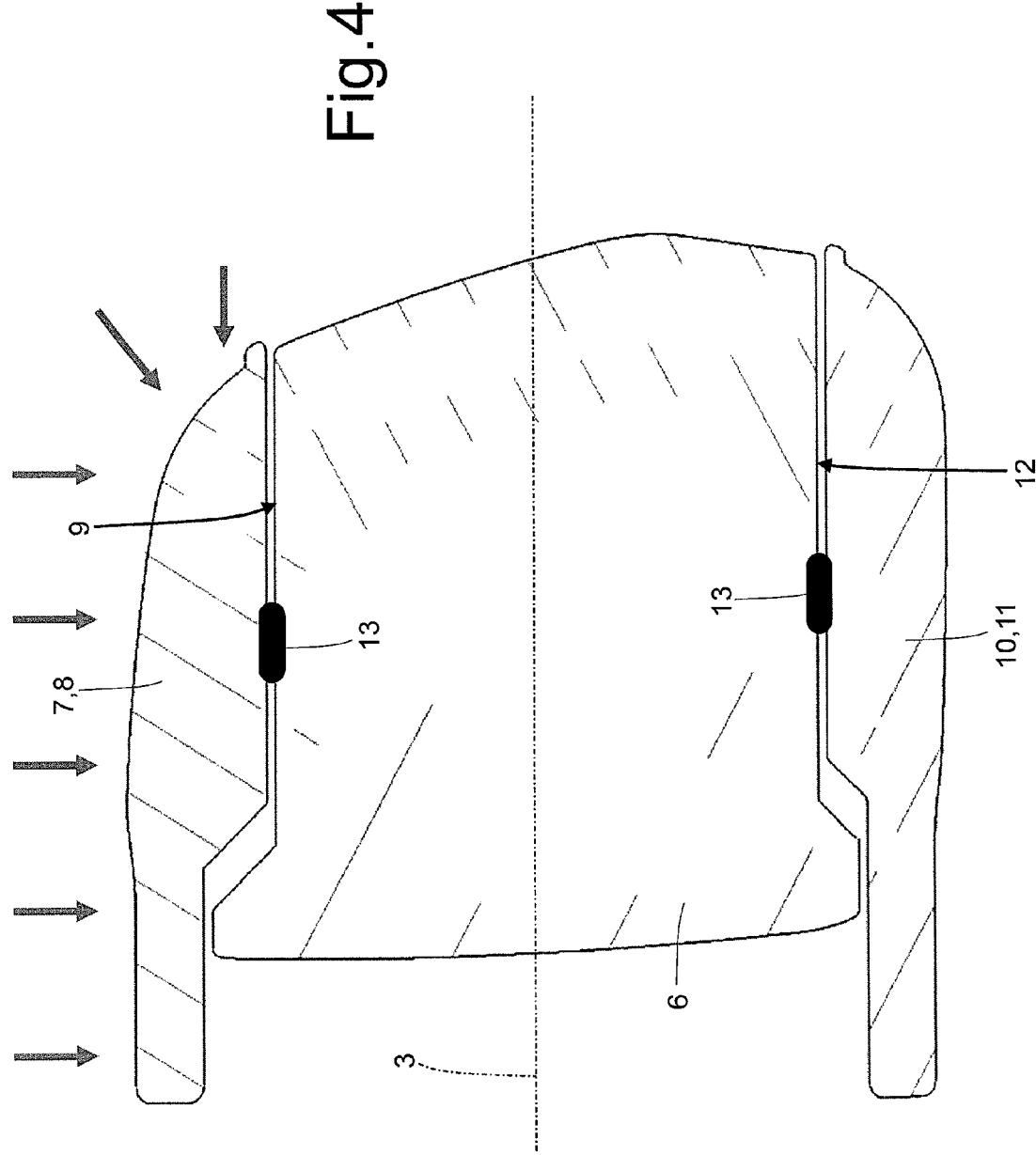
FIG. 4 is a diagrammatic sectional view of the control to operate the turn indicators in FIGS. 2 and 3.

As shown in FIG. 4, each control 7, 8, 10 and 11 is mounted on the corresponding spoke 6 so as to be able to be indifferently actuated with a radial movement or with an axial movement relative to the rotation axis 3 of the steering wheel 1; in this embodiment, each control 7, 8, 10 and 11 is mounted so as to float on the corresponding spoke 6 with the interposition of a single microswitch 13 which is actuated by moving control 7, 8, and 11 relative to spoke 6. According to alternative embodiments, each control 7, 8, 10 and 11 is mounted on the corresponding spoke 6 so as to be able to be only actuated with a radial movement relative to the axis rotation 3 of the steering wheel 1, or each control 7, 8, 10 and 11 is mounted on the corresponding spoke 6 so as to be able to be only actuated with an axial movement relative to the rotation axis 3 of the steering wheel 1.

Figure 5:
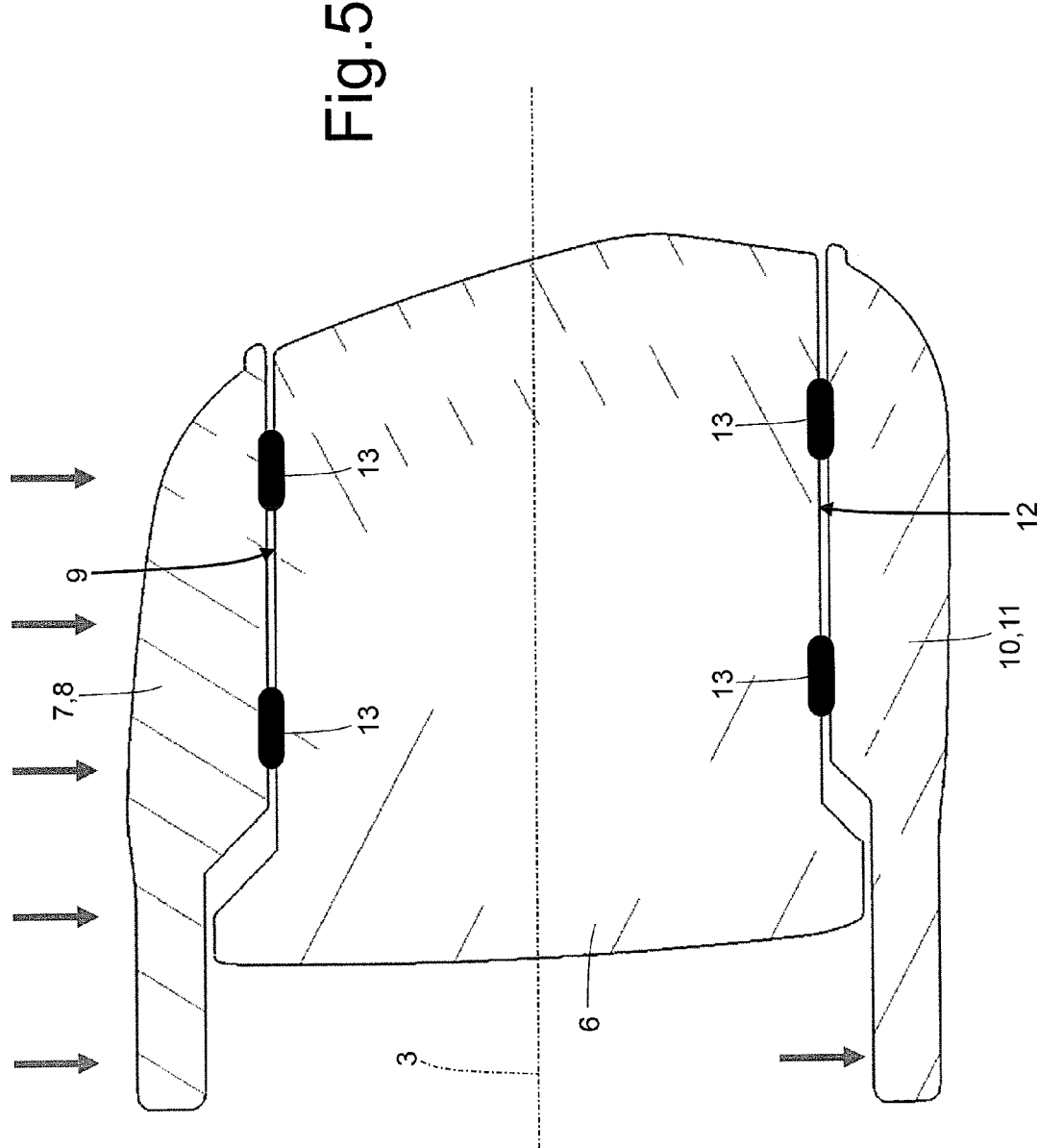
FIGS. 5 and 6 are corresponding diagrammatic sectional views of two construction variants of the control to operate the turn indicators in FIGS. 2 and 3.
Figure 6:
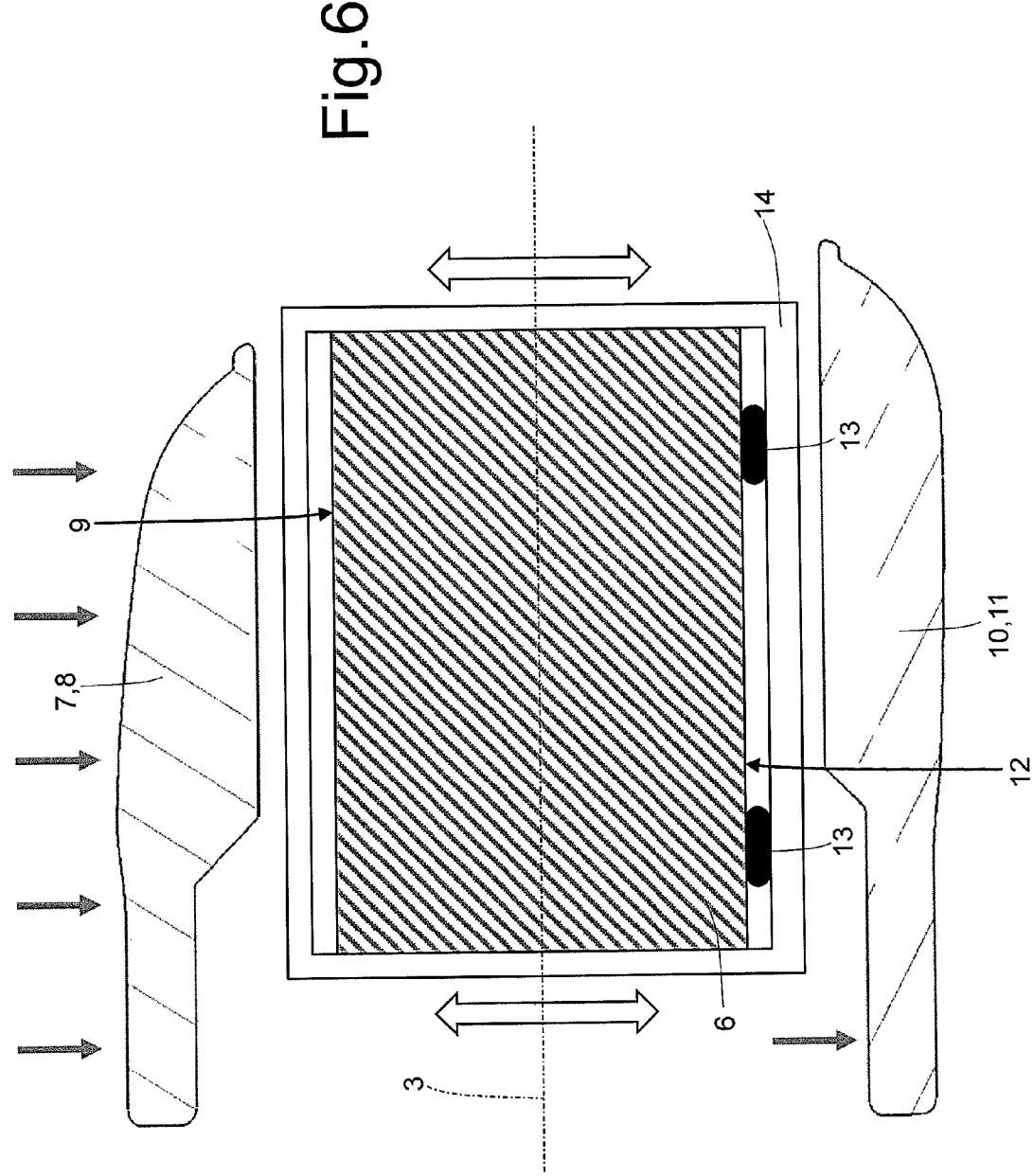

According to the variant shown in FIG. 5, each control 7, 8, 10 and 11 can be actuated with a radial movement relative to the rotation axis 3 of the steering wheel 1 (that is, with a vertical movement when the steering wheel 1 is in the neutral position) in a direction to operate the right turn indicators FD and can be actuated with a radial movement in an opposite direction to operate the left turn indicators FS; in this embodiment, each control 7, 8, 10 and 11 is mounted so as to float on the corresponding spoke 6 with the interposition of two separate microswitches 13 which are actuated in opposite directions with radial movements by moving control 7, 8, 10 and 11 relative to spoke 6 (that is, one microswitch 13 operates the right turn indicators FD and the other microswitch 13 operates the left turn indicators FS). In particular, when the steering wheel 1 is in the neutral position, the controls 7 and 10 can be pushed downwards (that is, they can be subjected to a vertical downward movement) to operate the left turn indicators FS and they can be pushed upwards (that is, they can be subjected to a vertical upward movement) to operate the right turn indicators FD; similarly, when the steering wheel 1 is in the neutral position, the controls 8 and 11 can be pushed downwards (that is, they can be subjected to a vertical downward movement) to operate the right turn indicators FD and they can be pushed upwards (that is, they can be subjected to a vertical upward movement) to operate the left turn indicators FS. It is worth noting that the above-mentioned directions for moving the controls 7, 8, 10 11 refer to the neutral position of the steering wheel 1, that is to the position of the steering wheel 1 corresponding to a straight trajectory.

As stated above, by rotating the steering wheel 1 by 180° (as shown in FIG. 7), each upper control 7 and 8 changes place with the opposite lower control 11 and 10; in this change between the upper controls 7 and 8 and the lower controls 11 and 10, the radial movement of the controls 7, 8, 10 and 11 themselves is also changed. That is, when the steering wheel 1 is in the neutral position, the controls 7 and 10 which are to the left operate the left turn indicators FS with a vertical downward movement and operate the right turn indicators FD with a vertical upward movement, and the controls 8 and 11 which are to the right operate the left turn indicators FS with a vertical upward movement and operate the right turn indicators FD with a vertical downward movement; by rotating the steering wheel 1 by 180° (as shown in FIG. 7), the controls 8 and 11 which are now to the left operate the left turn indicators FS with a vertical downward movement and operate the right turn indicators FD with a vertical upward movement, and the controls 7 and 10 which are now to the right operate the left turn indicators FS with a vertical upward movement and operate the right turn indicators FD with a vertical downward movement.

Thereby, by rotating the steering wheel 1 by 180° (as shown in FIG. 7), the upper controls 7 and 8 and the lower controls 10 and 11 change place without modifying the situation for the driver in any manner: indeed, when the steering wheel 1 is in the neutral position (as shown to the left in FIG. 7), there are left controls (controls 7 and 10) which operate the left turn indicators FS with a vertical downward movement and operate the right turn indicators FD with a vertical upward movement, and similarly when the steering wheel 1 is rotated by 180° (as shown to the right in FIG. 7), there are again left controls (controls 8 and 11) which operate the left turn indicators FS with a vertical downward movement and operate the right turn indicators FD with a vertical upward movement (a completely similar situation is also replicated for the controls arranged to the right).

In the embodiments shown in FIGS. 4 and 5, in the same spoke 6, the upper control 7 and 8 and the lower control 10 and 11 are mechanically independent of each other and are mounted on spoke 6 in an autonomous and separate manner. Instead, in the embodiment shown in FIG. 6, in the same spoke 6, the upper control 7 and 8 and the lower control 10 and 11 are supported by a same support element 14, which is mounted so as to be radially movable on spoke 6; in this embodiment, the support element 14 is mounted so as to float on the corresponding spoke 6 with the interposition of one or two microswitches 13 which are actuated by moving the support element 14 relative to spoke 6 (obviously, the support element 14 is always moved by acting on the corresponding controls 7, 8, 10 and 11). By comparing the embodiment shown in FIG. 5 to the embodiment shown in FIG. 6, it is noted how the embodiment shown in FIG. 6 allows the number of microswitches 13 to be halved.

Figure 8:
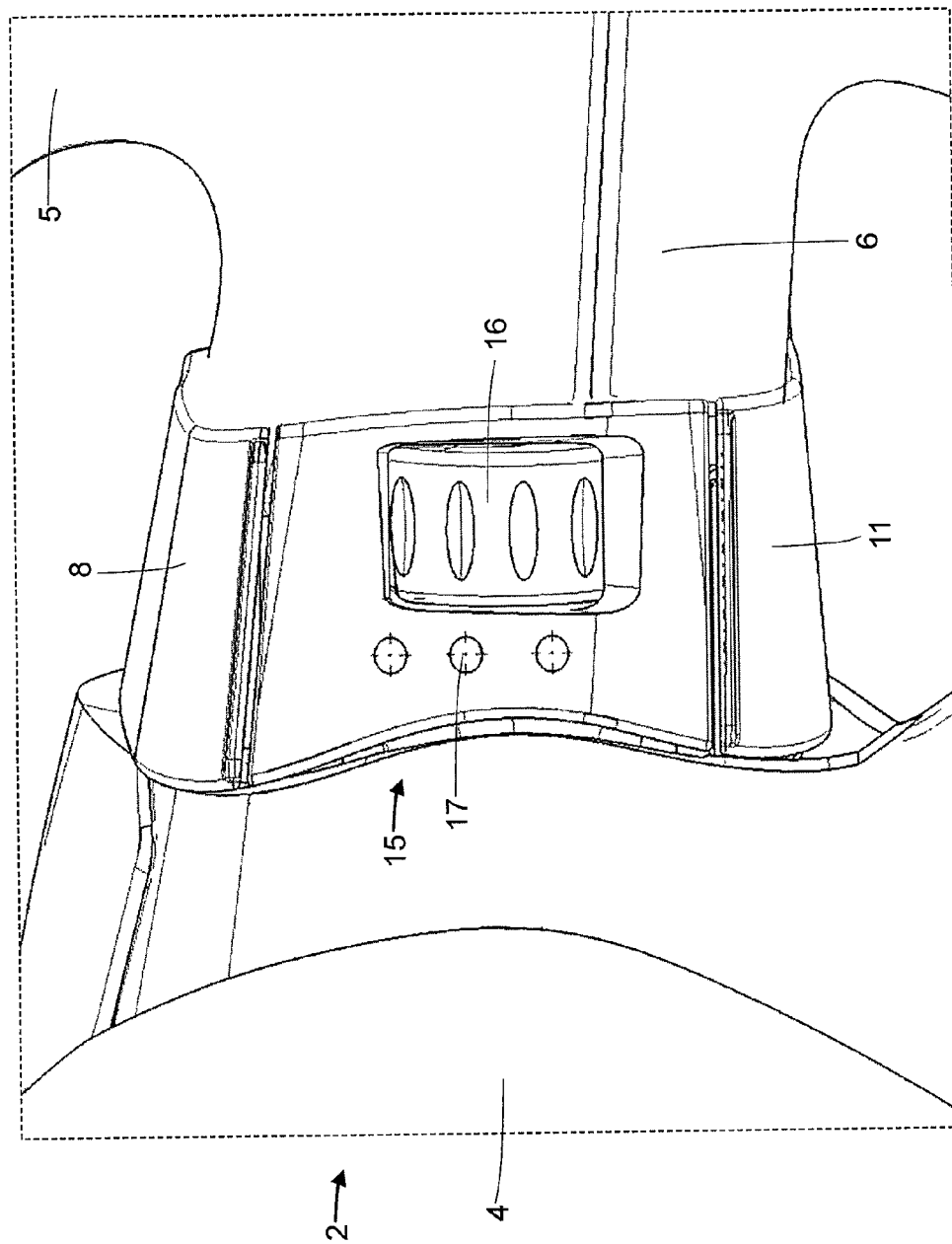
FIG. 8 is a perspective view of a control to operate the turn indicators of the steering wheel in FIG. 1, coupled to a control to regulate the intermittence of the windshield wiper.

As better shown in FIG. 8, the right spoke 6 (that is, spoke 6 which is arranged to the right of the central hub 2 when the steering wheel 1 is in the neutral position) also supports a control 15 for regulating the intermittence of the windshield wiper, which is arranged between the upper control 8 and the lower control 11. Control 15 comprises a wheel 16 which may be rotated in both directions to increase or decrease the rapidity of movement of the windshield wiper and of the light indicators 17 which indicate the rapidity of movement of the windshield wiper.

Figure 9:
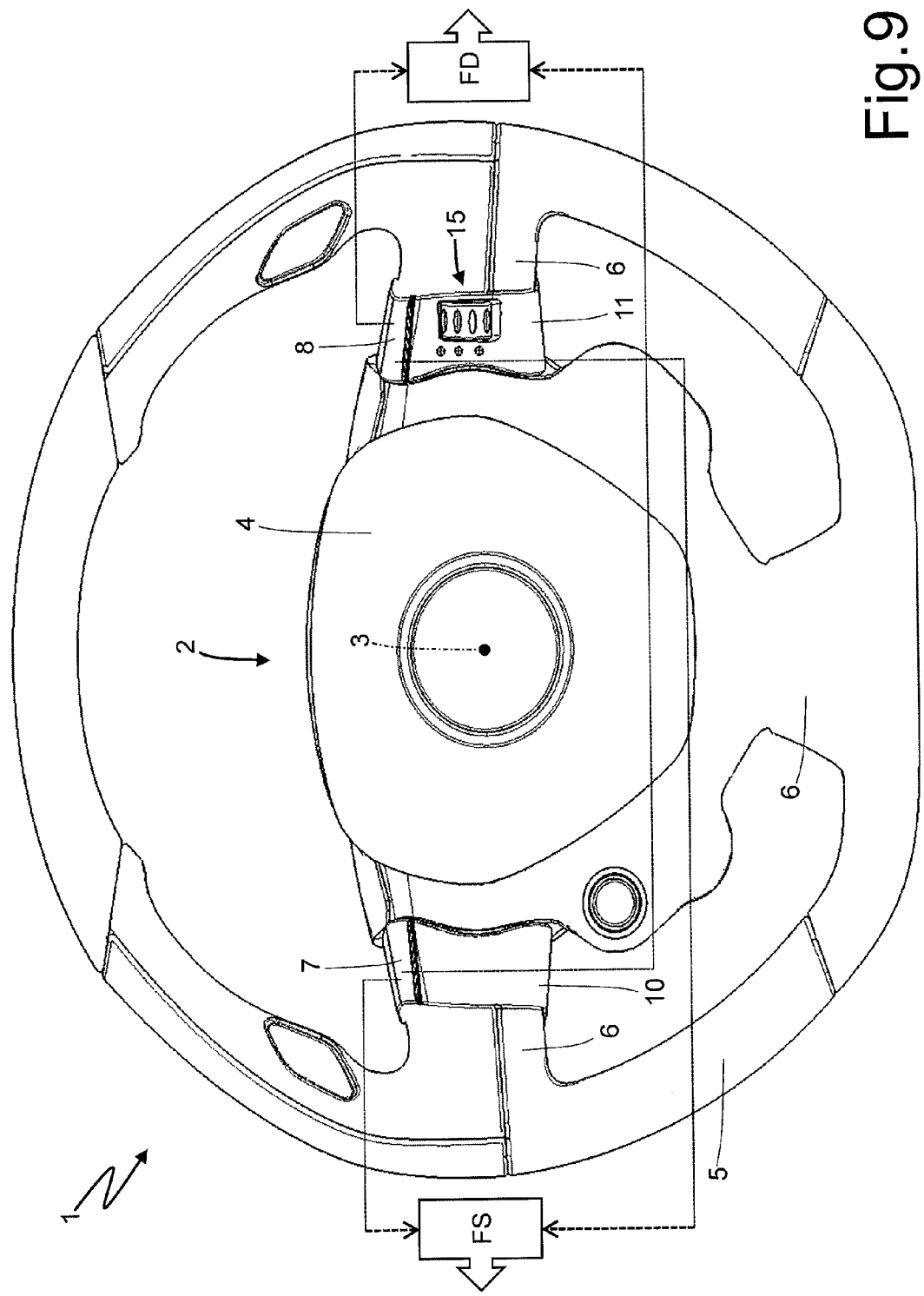
FIG. 9 is a perspective view of an alternative embodiment of the steering wheel in FIG. 1.

The spokes 6 of the embodiments shown in FIGS. 1-8 are provided with both the upper controls 7 and 8, and the lower controls 10 and 11 (which are redundant relative to the upper controls 7 and 8). The spokes of the embodiment shown in FIGS. 9-11 are only provided with the upper controls 7 and 8 (that is, the lower controls 10 and 11 are missing); furthermore, as is clearly shown in FIG. 11, the upper controls 7 and 8 of the embodiment shown in FIGS. 9-11 can be actuated with a radial movement in a direction to operate the right turn indicators FD and can be actuated with a radial movement in an opposite direction to operate the left turn indicators FS; in this embodiment, each upper control 7 and 8 is mounted so as to float on the corresponding spoke 6 with the interposition of two separate microswitches 13 which are actuated in opposite directions with radial movements by moving the upper control 7 and 8 relative to spoke 6 (that is, one microswitch 13 operates the right turn indicators FD and the other microswitch 13 operates the left turn indicators FS). In particular, when the steering wheel 1 is in the neutral position, the upper control 7 can be pushed downwards (that is, it can be subjected to a vertical downward movement) to operate the left turn indicators FS and can be pushed upwards (that is, it can be subjected to a vertical upward movement) to operate the right turn indicators FD; similarly, when the steering wheel 1 is in the neutral position, the upper control 8 can be pushed downwards (that is, it can be subjected to a vertical downward movement) to operate the right turn indicators FD and it can be pushed upwards (that is, it can be subjected to a vertical upward movement) to operate the left turn indicators FS.

According to a variant (not shown) of the embodiment shown in FIGS. 9-11, spokes 6 are only provided with the lower controls 10 and 11 (that is, the upper controls 7 and 8 are missing).

According to a further variant (not shown) of the embodiment shown in FIGS. 9-11, a single control 7, 8, 10 and 11 is provided being arranged on the right spoke 6 or on the left spoke 6.

In the above-described embodiments, the controls 7, 8, 10 and 11 operate the turn indicators FS and FD of the motor vehicle. According to a different embodiment, the controls 7, 8, 10 and 11 do not operate the turn indicators FS and FD of the motor vehicle, but operate other functions of the motor vehicle; for example, the controls 7, 8, 10 and 11 could operate ascending shifting and descending shifting, or the controls 7, 8, 10 and 11 could operate flashing (that is, the temporary switching-on of the high beams that is used as light signalling) and the horn (that is used as acoustic signalling).

The above-described steering wheel 1 has several advantages.

Firstly, by rotating the steering wheel 1 by 180° (as shown in FIG. 7), the upper controls 7 and 8 and the lower controls 10 and 11 change place without modifying the situation for the driver in any manner, who always has a top left control to operate the left turn indicators FS and always has a top right control to operate the right turn indicators FD.

Furthermore, the above-described steering wheel 1 is easy and cost-effective to be made because the addition of the lower controls 10 and 11 involves very modest increases in production and assembly costs.

Finally, the above-described steering wheel 1 is very pleasant to look at, due to its symmetry; in other words, the highly symmetrical arrangement of the controls 7, 8, 10 and 11 gives the steering wheel 1 a highly aesthetic appearance.

What is claimed is:
1. A motor vehicle steering wheel provided with controls to operate a first device and a second device of the motor vehicle; the steering wheel comprises:
 a central hub, which is mounted so as to rotate around a rotation axis;

an outer crown, which extends around the central hub, is suited to be held by the driver, and is rigidly coupled to the central hub by means of at least two spokes;

two upper controls, each of which is mounted on an upper surface of a corresponding spoke and operates a relative first or second device; and two lower controls, each of which is mounted on a lower surface of a corresponding spoke on the opposite side of the relative upper control, and operates the first or second device;

wherein each control can be actuated with a movement in a direction to operate the first device and can be actuated with a movement in an opposite direction to operate the second device; and wherein each upper control is symmetrically specular relative to the opposite lower control so that the upper control on one side when actuated in a direction operates the same device of the lower control on the opposite side when actuated in the opposite direction.

2. A steering wheel according to claim 1, wherein at least one control has a rear appendage, which projects from the rear side of the corresponding spoke.

3. A steering wheel according to claim 1, wherein each control is mounted on the corresponding spoke so as to be able to be actuated with a radial movement relative to a rotation axis of the steering wheel.

4. A steering wheel according to claim 1, wherein each control is mounted on the corresponding spoke so as to be able to be actuated with an axial movement relative to a rotation axis of the steering wheel.

5. A steering wheel according to claim 1, wherein each control is mounted on the corresponding spoke so as to be able to be indifferently actuated with a radial movement or with an axial movement relative to a rotation axis of the steering wheel.

6. A steering wheel according to claim 1, wherein, in the same spoke, the upper control and the lower control are mechanically independent of each other and are mounted on the spoke in an autonomous and separate manner.

7. A steering wheel according to claim 1, wherein, in the same spoke, the upper control and the lower control are supported by a same support element, which is mounted so as to be movable on the spoke.

8. A steering wheel according to claim 1, wherein each control can be actuated with a radial movement relative to the rotation axis in a direction to operate the first device and can be actuated with a radial movement relative to the rotation axis in an opposite direction to operate the second device.

9. A steering wheel according to claim 1, wherein a spoke supports a control to regulate the intermittence of the windshield wiper, which is arranged between the corresponding upper control and the corresponding lower control.

10. A steering wheel according to claim 1, wherein the two first and second devices are the right turn indicators and the left turn indicators.

* * * * *